Dec. 3, 1935.  A. A. THOMAS  2,022,902
ACOUSTIC AND CINEMATOGRAPHIC APPARATUS
Filed Nov. 16, 1929   4 Sheets-Sheet 1

INVENTOR
Adolph A. Thomas

Dec. 3, 1935.  A. A. THOMAS  2,022,902
ACOUSTIC AND CINEMATOGRAPHIC APPARATUS
Filed Nov. 16, 1929  4 Sheets-Sheet 2
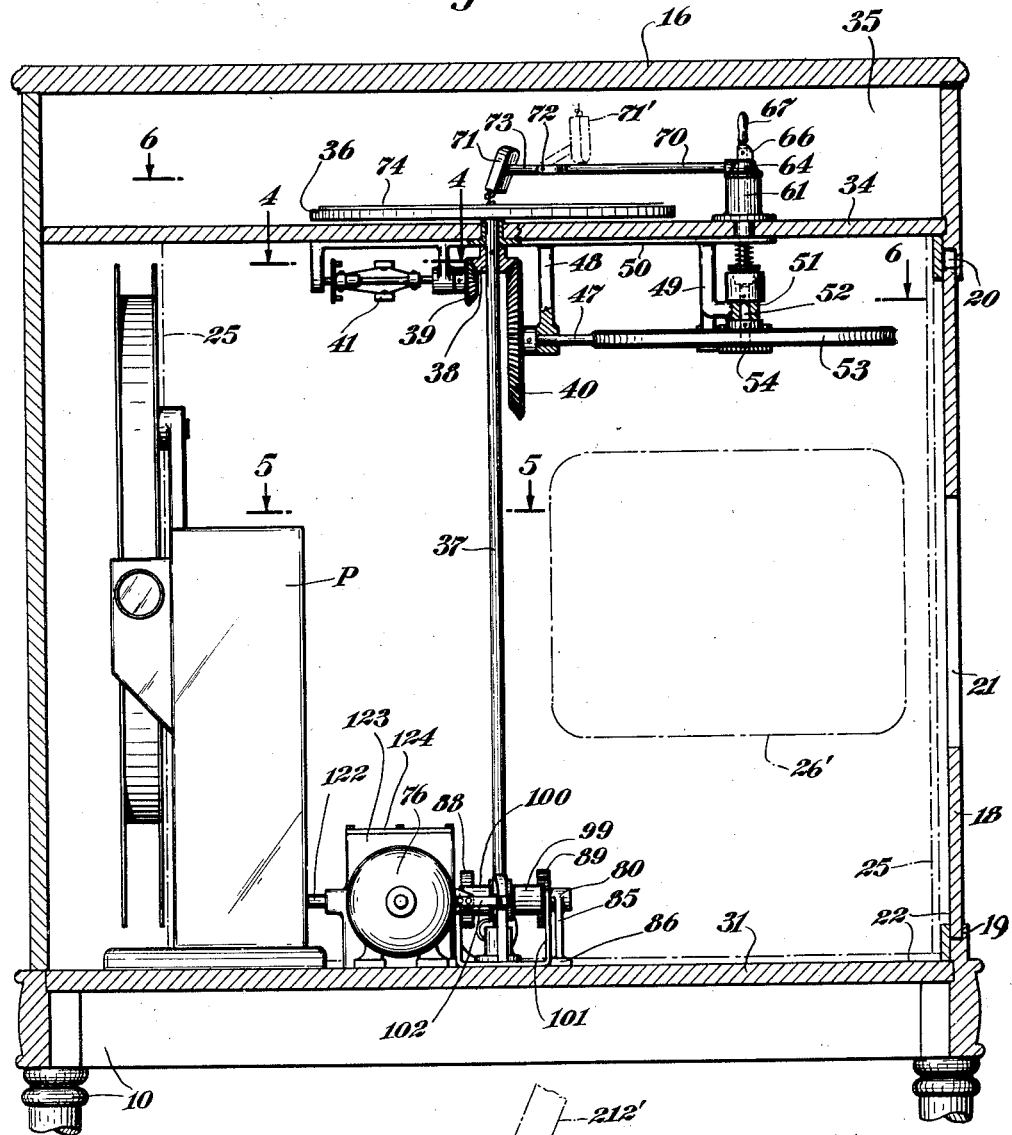
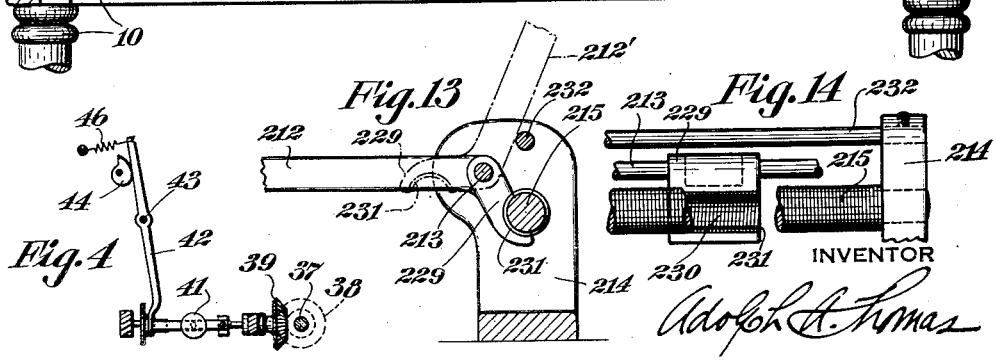
INVENTOR
Adolph A. Thomas Dec. 3, 1935.  A. A. THOMAS  2,022,902
ACOUSTIC AND CINEMATOGRAPHIC APPARATUS
Filed Nov. 16, 1929   4 Sheets-Sheet 3
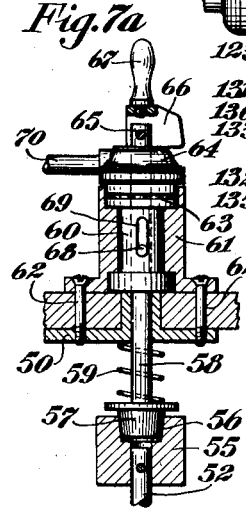
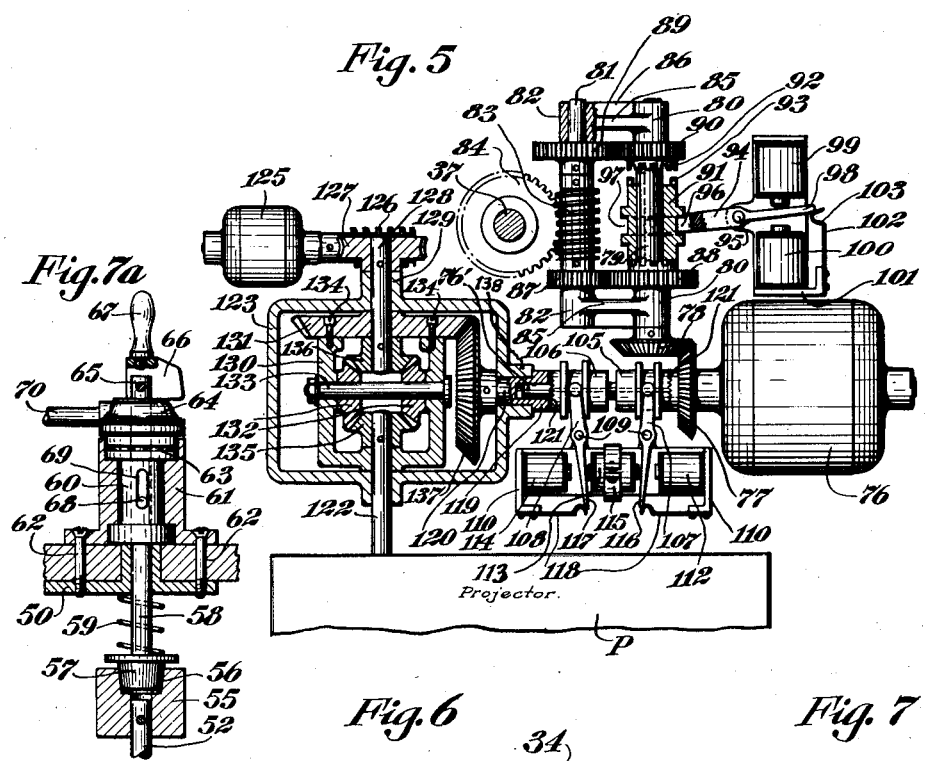
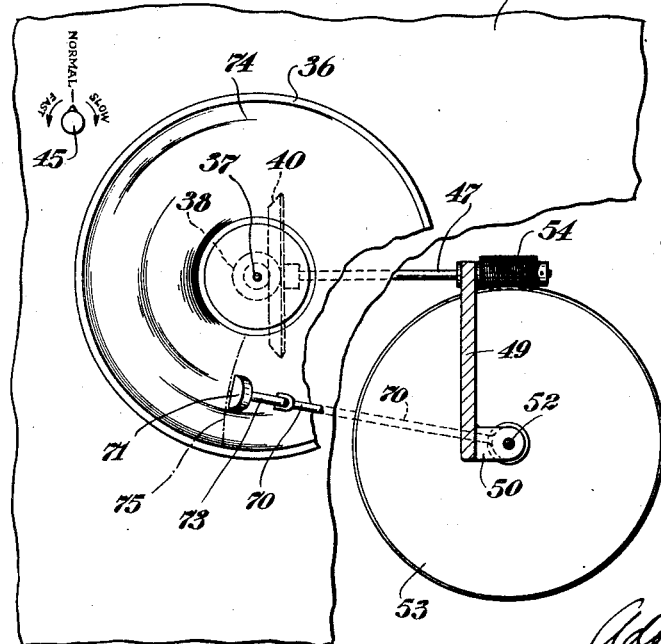
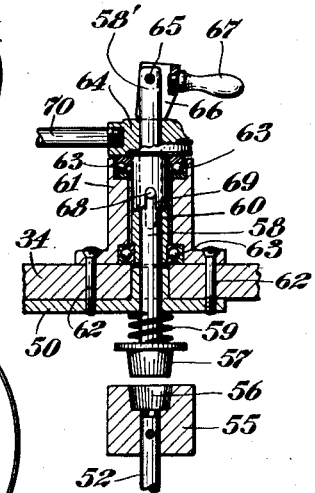
INVENTOR
Adolph A. Thomas Dec. 3, 1935. A. A. THOMAS 2,022,902
ACOUSTIC AND CINEMATOGRAPHIC APPARATUS
Filed Nov. 16, 1929 4 Sheets-Sheet 4
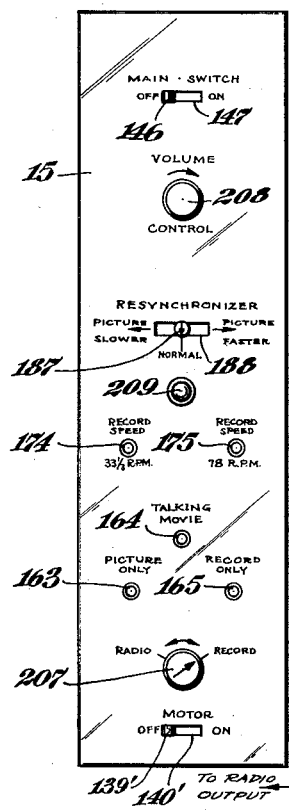
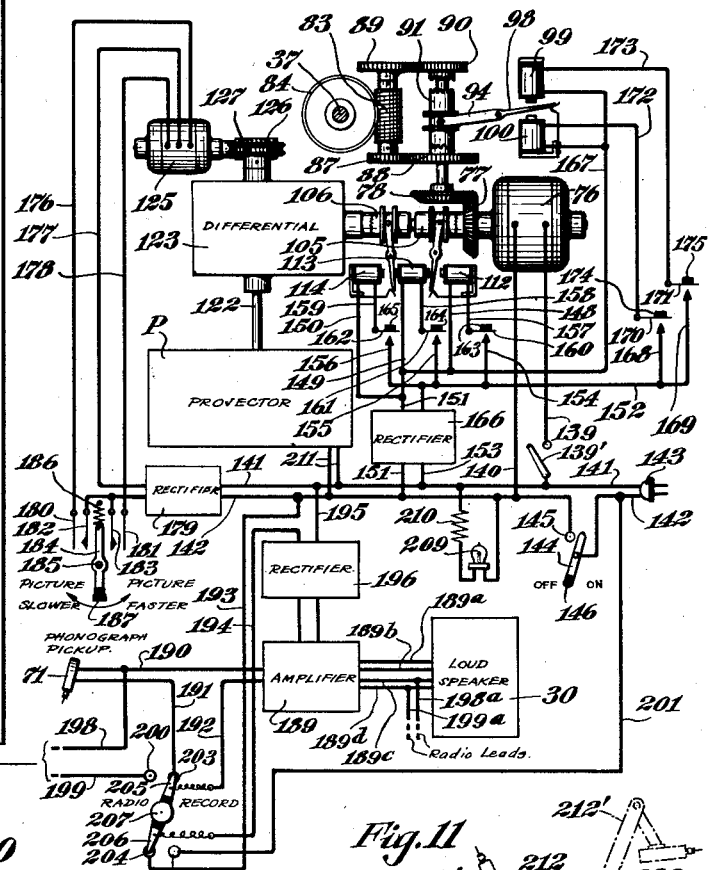
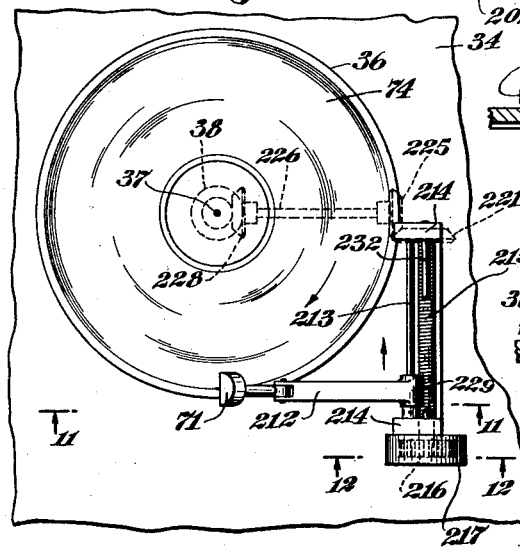
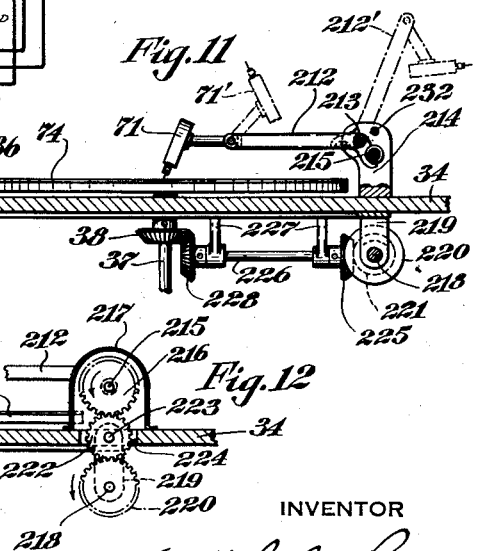
INVENTOR
Adolph A. Thomas Patented Dec. 3, 1935

2,022,902

UNITED STATES PATENT OFFICE 2,022,902

ACOUSTIC AND CINEMATOGRAPHIC APPARATUS

Adolph A. Thomas, New York, N. Y., assignor to Radio Corporation of America, a corporation of Delaware Application November 16, 1929, Serial No. 407,612

16 Claims. (Cl. 88—16.2)

This invention relates in general to the art of talking movies, and its principal object is to provide a self-contained cabinet for projecting motion pictures accompanied by sound. The various features of novelty that characterize my invention render the same particularly useful in the home, although certain parts of the invention are equally well adapted for the exhibition of talking films in theaters.

In talking pictures using the phonographic method of sound reproduction, the synchronization is frequently upset by the needle jumping the record track. I guard against this mishap by providing a positive drive for the pickup arm, so that the needle point is not merely guided by gravity through the spiral sound groove, but is independently actuated by a correctly timed connection from the motor shaft. In this way the pickup stylus is held at all times to its proper course in synchronism with the picture. Even if the needle should happen to jump out of the groove, as by striking an obstruction in the record, it could not swing laterally but would instantly drop back into the same groove. The pickup arm may be pivoted for swinging movement across the records, or it may be slidably mounted on a screwthreaded shaft. In either case I provide means for readily disconnecting the arm from its driving connection, so that the needle can instantly be placed in any point of the sound track. This separable driving connection also permits manual movement of the pickup to starting position.

Another feature of my invention comprises a manually operable resynchronizer for quickly bringing the sound and picture back to synchronism during the running of the film whenever the correct relation of the two has been disturbed for one reason or another. In talking pictures where the sound is recorded separately from the picture film, either on phonograph records or on sound films, the projector shaft and reproducer shaft are operated at the correct speed from a single motor. This makes it practically impossible for those two shafts to get out of step. However, it sometimes happens that the sound and the picture are not started in perfect synchronism, as when the stylus point is not placed in correct starting position on the phonograph record. Then again, a picture film that has been synchronized with a separate sound record is frequently changed in length by cutting out certain portions or inserting others. The most common causes of shortening a synchronized length of film are the removal of worn-out sections in the picture and the splicing of the broken ends of a ruptured film. At the present time there is no way of changing the length of sound track in a record synchronized with a given length of picture film, so that any alteration in the latter is bound to destroy the synchronism at some point during the projection of the picture. Right here is where my invention provides a quick and easy remedy: the operator need only move a convenient finger piece to speed up or slow down (as required) the film-driving shaft until picture and sound are again in synchronism. This adjustment is so simple that a child can do it.

In a preferred form of my invention, the phonographic mechanism can also be used without a film and operated like a simple phonograph. Or, the film projector can be used independently of the sound reproducer to run a silent picture. These different operations are brought about by merely pushing certain buttons on a front panel of the cabinet. I may also make provisions for playing the new low-speed records in addition to the regular records that run at about 78 revolutions per minute. The low-speed records are played at 33⅓ revolutions per minute, and have the advantage of greatly increased acoustic capacity. By operating a button or other finger piece, the speed of the turntable shaft is automatically adjusted for either type of record. The sound-reproducing system in my new cabinet may also be connected with a radio receiver by simply plugging the output terminals of the receiver into a jack on the cabinet.

The foregoing and other novel features and practical advantages of my invention will be understood from a description of the accompanying drawings, in which—

Fig. 3 shows an enlarged transverse section on the broken line 3—3 of Fig. 2;

Fig. 4 is a detached detail view of a speed regulator for the turntable shaft;

Fig. 5 is a section on line 5—5 of Fig. 3 and represents an enlarged plan view of the driving connections for the operating shafts of the film projector and phonograph turntable, certain parts being in section for clearness;

Fig. 6 is a plan view of the turntable and pickup arm, a portion of the motorboard being broken away to show the driving connections for the pickup arm;

Figs. 7 and 7a are enlarged detached views, partly in section, of the mounting and separable driving connection for the pickup arm, Fig. 7a showing the parts in normal position and Fig. 7 showing the pickup arm disconnected from its driving shaft;

Fig. 8 is a front view of the switch panel on the cabinet (see Fig. 1);

Fig. 9 is a combined plan view of the various driving connections and a diagram of circuits for controlling the apparatus;

Fig. 10 illustrates in plan a modified arrangement for supporting and operating the pickup arm;

Fig. 11 is a side view on line 11—11 of Fig. 10;

Fig. 12 is a section on line 12—12 of Fig. 10 to show certain details of gear connections; and Figs. 13 and 14 (on Sheet 2) are enlarged side and rear views of the mounting and screw-shaft drive of the pickup arm used in the modification of Figs. 10–12.

Figure 1:
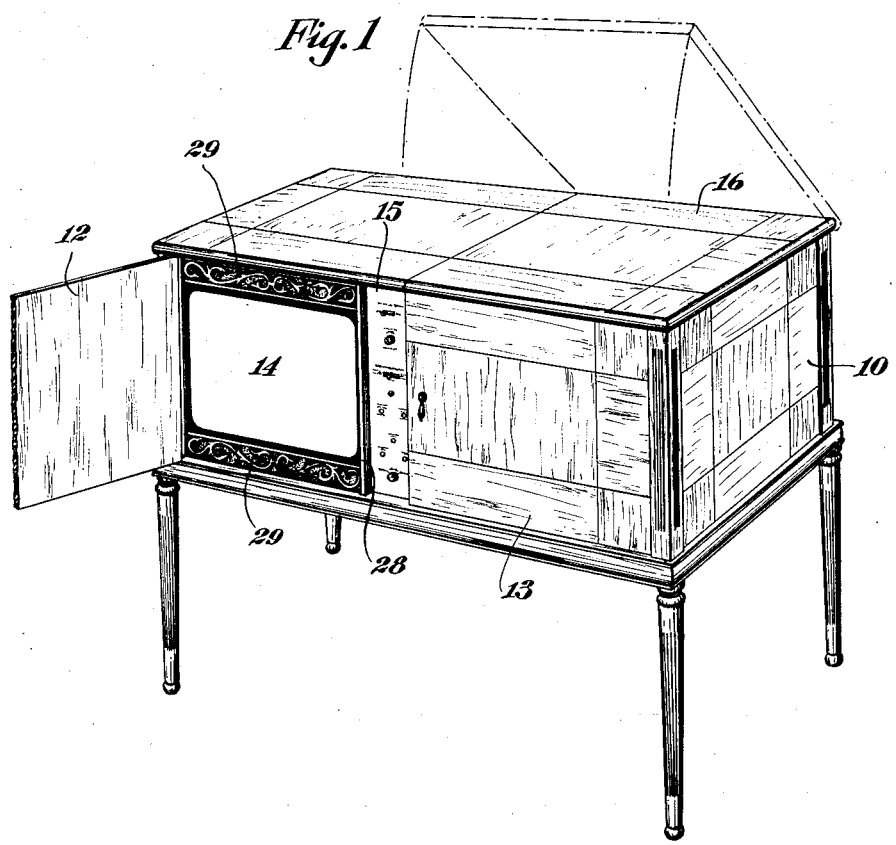
Fig. 1 illustrates a self-contained talking movie cabinet constructed for home use in accordance with my invention.

The operating mechanism is mounted in a cabinet 10 of suitable design and dimensions. The front of the cabinet has a pair of doors 12 and 13 hinged at their outer edges and when closed constituting the outer front wall of the cabinet. Behind the left door 12 is a motion picture screen 14 and a switch panel 15. The right door 13 gives access to a motion picture projector indicated as a whole by P. The top of cabinet 10 is at least in part formed by a hinged lid 16 which normally covers a phonographic turntable and reproducer. The back wall 17 of cabinet 10 may consist wholly or partly of a panel 18 supported for easy removal and replacement. As seen in Fig. 3, the lower edge of panel 18 rests in a groove 19, while its upper edge is retained in a recess 20 which permits the lower edge of the panel to be lifted out of the groove. The panel 18 may have openings 21 for the escape of sound and heat from the interior of the cabinet.

Figure 2:
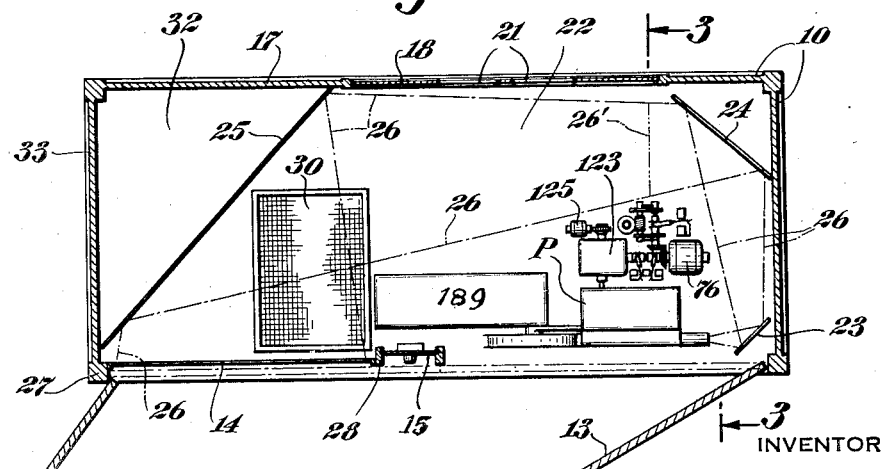
Fig. 2 is a sectional plan view of the cabinet.

The inside of cabinet 10 constitutes a chamber or compartment 22 which extends practically across the entire cabinet. The light from projector P is directed to screen 14 by mirrors 23, 24 and 25 arranged at the proper angle and supported in suitable frames or otherwise. The light path is diagrammatically indicated by the dash-dot lines 26. No part of the interior mechanism extends into the path of the projecting rays, as will be clear from Figs. 2 and 3, where the dotted outline 26' represents the cross-sectional area of the picture in the plane 3—3 of Fig. 2. The screen 14 is made of any material suitable for exhibiting pictures by transmitted light, such as ground glass, cheesecloth, thin white silk and others that may be found practical. The size of the screen is commensurate with the magnification of the film. If the projector P is designed for 16 mm. film, the screen 14 ought not to be larger than 3½ x 5 feet for a good reproduction, and should preferably be smaller for the best results. On account of the arrangement of projector P and the reflecting mirrors 23, 24 and 25, it is possible to obtain a maximum length of path for the light rays between projector and screen. As seen in Fig. 2, the length of the projection path is considerably greater than the length of cabinet 10. Since the projector P and screen 14 are fixed in permanent relative position, no adjustment of those parts is necessary. The screen 14 is preferably built into the cabinet as a permanent part thereof, but it may be mounted on a removable frame, if desired. In Fig. 2 the screen 14 is mounted between a corner post 27 of the cabinet and an upright 28. The ornamental grille 29 above and below the screen 14 permits the passage of sound from a suitable loudspeaker 30 in the cabinet.

In the present instance the loudspeaker 30 is supposed to be of the electrostatic type, which may be built as a flat structure mounted on the bottom board 31 of the cabinet. In fact, several condenser speakers may be mounted on board 31, because there is sufficient room for that purpose, and they do not extend into the path of the projected picture. Since the sound generated by the loudspeaker diaphragm or diaphragms passes into the outer air through grille 29, and perhaps also through the screen 14 itself (if the latter is of thin porous fabric), the resultant effect produced on the hearers is that of sound issuing directly from the figures in the picture. The loudspeaker 30 may also be open to the outer air through sound openings in the back panel 18, and it is possible to arrange the diaphragm face downward and directly exposed to the outer air through an opening in the bottom of the cabinet. The chamber 22 tends to amplify the sound before it issues into the outer air. The large mirror 25 is preferably arranged to close off the space 32 entirely, so that the same will not act as a trap or pocket for sound waves. The space 32 need not be left empty, but may be used as a storage chamber for phonograph records and film reels. In that case, the left side 33 of the cabinet would be hinged to give access to chamber 32. It will be noticed in Fig. 2 that the mirror 25 also acts to direct sound waves through grille 29 and screen 14, if the latter is acoustically pervious.

Referring to Fig. 3, it will be noticed that the cabinet 10 has a top board 34 which forms a shallow chamber 35 with the hinged lid 16. The top board 34 need only extend across the right half of the cabinet, and the lid 16 covers only the shallow chamber 35, which contains a phonograph turntable 36 and reproducing mechanism operatively associated therewith. The turntable 36 is mounted on the upper end of a vertical rotary shaft 37, which extends through the top board 34 and is supported at its lower end in a suitable bearing mounted on the bottom board 31. The upper end of shaft 37 carries a bevel pinion 38, which meshes at one side with a bevel pinion 39 and at the opposite side with a large bevel gear 40. The bevel pinion 39 drives a centrifugal governor 41 of usual construction, which is so well known that no detailed description thereof is required. I need only say that the speed-regulating action of governor 41 is controlled by a lever 42 pivoted at 43 and adapted to be operated by a cam 44. A knob or other finger piece 45 (see Fig. 6) on top board 34 is adapted to rotate cam 44 for adjusting the position of lever 42, which is constantly held against the cam by a light coil spring 46. If the turntable shaft 37 is driven by an electric motor provided with a rheostat or other electric means for controlling its speed, the centrifugal governor 41 may (and usually will) be omitted; but even then it may be used as a steadying load on shaft 37, especially when the machine is used as a phonograph alone.

The bevel gear 40 is fixed on a shaft 47 which is supported at its ends in brackets 48 and 49 depending from the underside of the top board 34. The brackets 48 and 49 may be cast integral with a supporting plate 50 attached to the top board 34 in any practical way. The bracket 49 has a bearing 51 which supports a vertical stud shaft 52. The lower end of stud shaft 52 carries a large gear 53 arranged permanently in mesh with a worm or spiral pinion 54, which is secured on one end of shaft 47. The upper end of stud shaft 52 carries a block 55 provided with a friction recess 56 adapted to receive a correspondingly shaped plug 57, which is fixed to the lower end of a vertically movable shaft 58. When the plug 57 is firmly seated in recess 56, as shown in Fig. 7a, the aligned shafts 52 and 58 are coupled for simultaneous rotation. An expanding coil spring 59 on shaft 58 holds the bevel plug 57 in tight frictional engagement with the wall of recess 56, so that no slipping is possible between shafts 52 and 58. For this purpose the engaging surfaces of recess 56 and plug 57 may be finely grooved or otherwise roughened to lock the parts together. The shaft 58 extends through a rotary sleeve 60 mounted in a hollow casing 61, which is rigidly attached to top board 34 by screws or bolts 62. These fastening devices may engage the metal plate 50, as shown in Figs. 7 and 7a, whereby the mounting of casing 61 is facilitated. Ball bearings 63 may be used for obtaining a smooth and easy movement of sleeve 60.

As best shown in Figs. 7 and 7a, the upper end of shaft 58 extends through a head or block 64 rigidly attached to the rotary sleeve 60, or cast integral therewith. The upper projecting end 58' of shaft 58 carries a cross-pin 65 for pivotally supporting a cam plate 66, which is operated by means of a handle 67. The cam plate 66 is preferably a U-shaped plate arranged to straddle the projecting end 58' of shaft 58, whereby a more rigid structure is obtained. A cross-pin 68 on shaft 58 extends at one or both ends into one or two axial slots 69 in sleeve 60, whereby the shaft and sleeve are permanently coupled for simultaneous rotation. At the same time, the pin and slot connection 68—69 permits vertical movement of shaft 58 through sleeve 60. When the handle 67 of cam plate 66 is vertical, the shafts 52 and 58 are coupled together through the friction clutch 56—57, as shown in Fig. 7a. When the handle 67 is pushed back into horizontal position (see Fig. 7), the shaft 58 is lifted to disengage the plug 57 from the clutch wall of recess 56, whereby the shaft 58 is disconnected from the driving shaft 52.

The block or head 64 of the rotary sleeve 60 supports an arm 70 which carries an electric pickup 71 of any approved type and construction. The pickup 71 is pivoted to arm 70 at 72, so that it can be thrown back for easy insertion of a needle, as indicated by the dotted outline 71' in Fig. 3. The supporting arm 70, which is incapable of vertical movement, is rigidly attached to the head 64 in any practical way, as by screwthreads or a set-screw, or perhaps merely by means of a tight frictional fit. If the arm 70 is a hollow tube, it may be used to hide (in part at least) the electrical conductors for pickup 71. The weight of arm 70 is not communicated to the needle in pickup 71, because of the hinged connection 72 which allows the necessary up and down movement of the pickup as a whole during the playing of a record. The hinged connection 72 is such that lateral movement of the pickup casing with respect to the supporting arm 70 is prevented. In other words, the short extension 73 of pickup 71 is in effect a rigid extension of arm 70 for the lateral travel of the stylus across the record. When the shafts 52 and 58 are connected by clutch 56—57, as previously explained, the sleeve 62 is rotated horizontally and carries with it the arm 70 and pickup 71. The transmission connection between the turn-table shaft 37 and arm 70 is such that the stylus point of the pickup is propelled radially across a rotating record at a speed that holds the point safely in the spiral sound groove. In Figs. 3 and 6, the record on turntable 36 is indicated diagrammatically by the numeral 74, and the dotted line 75 in Fig. 6 indicates approximately the path of the stylus point across the record. The line 75 is an arc with the axis of shaft 58 as the center, which means the pivotal axis of arm 70.

It will be clear from the above description that the pickup 71 is actuated positively across the turntable, so that the stylus point can not become laterally displaced with respect to the record groove during the playing of the machine. This positive feed of the stylus point across the record insures the synchronism of sound and picture when the machine is operated as a talking movie, as will presently be explained. When it is desired to free the pickup arm 70 from the actuating shaft 52, it is only necessary to push down the handle 67, whereby the clutch connection 56—57 is broken, as shown in Fig. 7. In the actual machine, the vertical movement of shaft 58 need only be a small fraction of an inch, because all that is necessary is to move the clutch member 57 slightly away from the surface of recess 56. In Fig. 7 I have purposely exaggerated the movement of shaft 57 to promote clearness in the drawings.

Referring to Fig. 5, the turntable shaft 37 is geared to an electric motor 76 mounted on the bottom board 31 in chamber 22. The motor shaft 76' carries a bevel gear 77 in mesh with a bevel gear 78 fixed on a shaft 79 which is supported in bearings 80. The bevel gear 77 is not fixed to the motor shaft 76', but is loosely mounted thereon. The clutch means by which the gear 77 is coupled to shaft 76' will be described in due course. A shaft 81 supported in bearings 82 has a worm or spiral sleeve 83 meshing with a worm gear 84 fixed on the lower end of shaft 37. The bearings 80 and 82 of the two parallel counter-shafts 79 and 81 may be carried by brackets 85 projecting from a base plate 86, which is rigidly secured to the bottom board 31 in any pratical way. The parts 80, 82, 85 and 86 may be a single casting of aluminum or other suitable metal. A small pinion 87 fixed on shaft 81 meshes with a large pinion or gear wheel 88 mounted loosely on shaft 79, and a gear wheel or large pinion 89 fixed on shaft 81 engages a small pinion 90 also mounted loosely on shaft 79. A slidable clutch sleeve 91 is keyed to shaft 79 between the loose gear members 88 and 90, which are provided with teeth 92 adapted to engage similar teeth 93 at the opposite ends of clutch sleeve 91. A lever 94 pivoted on a stud 95 has a pair of arms 96 engaging in a groove 97 of clutch member 91. The arms 96 usually terminate in a pair of rollers that enter groove 97 at diametrically opposite points, in accordance with old practice. The clutch-operating lever 94 has a magnetic armature extension 98 arranged between a pair of electromagnets 99 and 100, which may conveniently be supported on a U-shaped bracket 101 (see Fig. 3) secured to the bottom board 31. The armature extension 98 may either be integral with lever 94, or it may be a separate magnetic piece attached to the lever.

When the electromagnet 99 is energized, the clutch member 91 is shifted into locking engagement with gear 88, so that the motor shaft 76' is connected to the turntable shaft 37 through the speed-increasing gears 88 and 87. When the electromagnet 100 is energized, the clutch member 91 is shifted into engagement with pinion 90, so that the electric motor is geared to the turntable shaft 37 through the speed-reducing gears 90 and 89. Assuming that the electric motor 76 operates at a predetermined speed, the gear connection 88—87 drives the turntable shaft 37 for playing standard records at approximately 78 revolutions per minute. When the shaft 37 is driven through the reducing gears 90—89, the turntable rotates at a speed of approximately 33⅓ revolutions per minute for playing the so-called low-speed records that are sometimes used in connection with talking movies. The speed-selecting electromagnets 99 and 100 are controlled by push buttons located on the front switch panel 15, as will later be explained more fully. The clutch lever 94 is held in either position by a spring arm 102 attached to frame 101. The free end of arm 102 is in the form of a bevelled cam or offset 103 arranged to press against either side of armature 98. The offset 103 is so shaped that it is moved out of the way by the free end of armature 98 to permit operation of lever 94. Any other practical means may be used for holding the clutch member 91 firmly in engagement with either one of the associated gears 88 and 90.

Still referring to Fig. 5, it will be seen that the motor shaft 76' carries a pair of clutch sleeves 105 and 106 adapted to be independently operated by levers 107 and 108 respectively. The preceding description of the connection between lever 94 and clutch sleeve 91 is applicable to the connections between levers 107—108 and their respective clutch sleeves 105—106. The clutch levers 107 and 108 are pivoted on studs 109 carried by a frame 110, which also supports three electromagnets 112, 113 and 114. The two outer electromagnets 112 and 114 may be attached to the vertical ends of frame 110, while the middle electromagnet 113 is secured by a strap 115. The clutch lever 107 has an armature 116 arranged to extend between the electromagnets 112 and 113, while the other clutch lever 108 has an armature 117 extending between the two electromagnets 113 and 114. Spring arms 118 attached to frame 110 hold the levers 107 and 108 in either position, as previously explained in connection with clutch lever 94. The clutch sleeves 105 and 106 are keyed to shaft 104 so as to rotate therewith at all times, but this key connection permits axial or slidable movement of the clutch sleeves on the shaft.

When the electromagnet 113 is energized, the two clutch sleeves 105 and 106 are moved apart into locking engagement, respectively, with bevel gear 77 and the hub 119 of shaft 120. The coupling engagement between the parts 77—105 and 119—106 is indicated by interlocking clutch teeth 121. The coupling of clutch sleeve 105 to bevel gear 77 connects the motor shaft 76' with the turntable shaft 37. When the clutch sleeve 106 is connected to shaft 120, the motion picture projector P is operated, as I am about to explain in detail. Hence, the energization of electromagnet 113 causes the machine to operate as a talking movie. When the electromagnet 112 is energized to disconnect the clutch sleeve 105 from gear 77, the electric motor 76 drives only the projector-operating shaft 120, so that the machine projects the picture without the sound-reproducing mechanism. To operate the machine as a phonograph without the projector, it is only necessary to energize the electromagnet 114 which disconnects the clutch sleeve 106 from shaft 120 and leaves the other clutch 105 in engagement with the bevel gear 77.

It is not intended that the electromagnets 112 and 114 shall be energized at the same time. When the electromagnet 112 is energized to operate only the projector, the clutch sleeve 105 is shifted to the left (as viewed in Fig. 5). If the other clutch sleeve 106 should previously have been left out of engagement with the clutch end 119 of shaft 120, the left end of clutch 105 will strike the adjacent end of clutch sleeve 106 and move the latter into engagement with shaft 120. A similar operation takes place when the clutch sleeve 106 is shifted to the right. In that case, if the clutch sleeve 105 has previously been left out of engagement with gear 77, the right end of clutch sleeve 106 will strike the adjacent end of clutch sleeve 105 to connect the motor shaft 76' with the turntable shaft 37. This arrangement, whereby either clutch member 105 and 106 actuates the other, insures the proper connections when the electromagnets 112 and 114 are separately energized. When the central electromagnet 113 is energized to operate the machine as a talking movie, whichever clutch sleeve 105 and 106 was previously left in an inoperative position will be moved into engagement with its associated clutch member 77 and 119.

The motion picture projector P, which may be of any approved construction, has a shaft 122 operatively connected to the film-driving sprockets in the projector. Since projectors have become more or less standardized and are available in the market in various makes, styles and sizes, it will not be necessary to show or describe any structural details of the mechanism. For convenience I shall refer to shaft 122 as the projector shaft, which sets the apparatus in operation for projecting the film on screen 14. The shaft 122 projects into a casing 123 mounted on the bottom board 31. A removable top plate 124 permits ready access to the interior of casing 123. A small electric motor 125 has a driving worm or spiral 126 arranged in mesh with a small gear or pinion 127 fixed on a shaft 128, which is rotatably mounted in bearing 129 of casing 123. The shafts 122 and 128 are in axial alignment and support a differential gear assembly comprising a frame 130 which carries a bevel gear 131 and a pair of bevel pinions 132. A bolt or pin 133 extending through frame 130 acts as a common shaft for pinions 132. The bevel gear 131 is secured to one end of frame 130 by screws 134 or otherwise. The frame 130 is loosely mounted on shaft 122 and the bevel gear 131 is loose on shaft 128, so that the differential gear assembly is supported jointly by those two shafts for independent rotation. The adjacent ends of shafts 122 and 128 carry bevel pinions 135 and 136, which are secured to the shafts and mesh with the differential pinions 132. The bevel gear 131 engages a bevel gear 137 fixed on the inner end of the rotary shaft 120 which is journalled in a bearing 138 projecting from casing 123.

The operation of the differential gear assembly described in the preceding paragraph is as follows: The shaft 128 and bevel pinion 136 are normally stationary, so that the rotation of bevel gear 137 on shaft 120 is transmitted to bevel gear 131 and frame 130. Since the bevel pinion 136 is stationary, the bevel pinions 132 of the rotating frame 130 are rotated about their common pivot 133 and thereby rotate the bevel pinion 135 on projector shaft 122. The transmission connections between the motor shaft 76' and the projector shaft 122 are so calculated that the film in projector P is moved across the optical field at the correct speed, so that picture and sound are in synchronism when the machine is operated as a talking movie. When it is desired to change the normal speed of projector shaft 122, the electric motor 125 is energized to operate shaft 128 in one direction or the other, depending upon whether the projector shaft is to be rotated faster or slower than normal speed. It is assumed that the electric motor 125 is reversible by changing the direction of current flow through the motor windings, but the operation of shaft 128 in either direction may also be obtained by reversible driving connections with the motor shaft. When the differential shaft 128 is operated in the same direction as frame 130, the speed of rotation of the bevel gears 132 about their common pivot 133 is reduced, and that means a corresponding decrease in the speed of projector shaft 122. When the shaft 128 is rotated in the opposite direction to gear 131, the rotational speed of bevel pinions 132 is increased with a corresponding increase in the speed of projector shaft 122. Since the function of motor 125 is to bring the picture into synchronism with the accompanying sound, I shall refer to that motor as the synchronizing motor and the shaft 128 may be called the synchronizing shaft. The operation of motor 125 is controlled by a pair of push buttons, one for speeding up the picture and the other for slowing it down.

I shall now describe the circuit connections for controlling the various electromagnetic clutches heretofore mentioned and the synchronizing motor 125. Referring to Fig. 9, the main driving motor 76 is connected by conductors 139 and 140 to a pair of service mains 141 and 142 which extends from a plug 143 adapted to be inserted in a house-lighting socket. A suitable switch 139' is included in conductor 139, and a main power switch 144—145 is inserted in supply lead 142. For convenience I have diagrammatically indicated the main switch by a pivoted lever 144 and a stationary contact 145. An insulated finger piece 146 projects through a slot 147 in switch panel 15 (see Fig. 8) for moving the switch member 144 to "on" and "off" positions. The operating handle of motor switch 139' extends through a slot 140' at the bottom of panel 15. At the present time, the most popular type of switches are the so-called toggle or snap-over switches, which give a quick make and break. The three electromagnets 112, 113 and 114 are connected at one side by conductors 148, 149 and 150 to a common conductor 151, which goes to the service main 142. A conductor 152, which is connected to the service main 141 by a conductor 153, has three parallel branches 154, 155 and 156. Conductors 157, 158 and 159 connect one side of electromagnets 112, 113 and 114 to movable switch arms 160, 161 and 162, respectively. The branch conductors 154, 155 and 156 terminate in stationary contacts arranged to be engaged by the movable switch arms 160, 161 and 162, which are indicated merely in a diagrammatic way. The switch board or panel 15 has three insulated push buttons 163, 164 and 165, which are connected to (or otherwise operate) the switch arms 160, 161 and 162, respectively. If necessary, a suitable rectifier 166 may be inserted in conductors 151 and 153 for feeding direct current through the coils of electromagnets 112, 113 and 114.

Still referring to Fig. 9, one side of electromagnets 99 and 100 is connected to a conductor 167 which leads to conductor 151. Two branches 168 and 169 of conductor 152 terminate in stationary contacts associated with movable switch arms 170 and 171. The other side of electromagnet 100 is connected by a conductor 172 to switch arm 170, and the other side of electromagnet 99 is conducted by a conductor 173 to switch arm 171. The two switch arms 170 and 171, which may be simply spring blades normally in open position, may conveniently be actuated by push buttons 174 and 175 mounted on switch panel 15. The synchronizing motor 125 is shown here as a reversible motor connected to the house-lighting mains 141 and 142 by conductors 176, 177 and 178. If necessary, a suitable current rectifier 179 may be employed to operate the motor 125 on direct current. Conductors 176 and 178 are connected to switch contacts 180 and 181 which cooperate with a pair of movable switch arms 182 and 183, respectively. These switch arms may be in the form of spring blades held normally in open position by their inherent tension and arranged on opposite sides of an insulated switch lever 184 pivoted at 185. A light coil spring 186 normally holds the lever 184 in neutral position out of engagement with either switch arm 182 and 183. A knob or other suitable finger piece 187 projecting through a slot 188 in panel 15 serves as a convenient means for moving the lever 184 to close either of the switches 180—182 and 181—183. It is understood that, when the switch 180—182 is closed, the motor 125 operates the differential shaft 128 in a direction to increase the normal speed of the projector shaft 122, so that the picture can be speeded up until it reaches synchronism with the sound record. When the finger piece 187 is moved to the left to close the switch 181—183, the direction of rotation of motor 125 and shaft 128 is reversed to decrease the normal speed of the projector shaft 122.

The electric phonograph pickup 71 is operatively connected to an amplifier 189 by conductors 190, 191 and 192. The amplifier 189 is operatively connected to the loudspeaker 30 mounted in cabinet 10, this connection being diagrammatically indicated by conductors 189a to 189d. Conductors 189a and 189b carry the field current or polarizing potential for the loudspeaker, while conductors 189c and 189d are connected in the talking circuit of the loudspeaker. The amplifier mechanism 189 derives power from house-lighting circuit 141—142 through conductors 193, 194 and 195. If the source of current is alternating, a suitable rectifier 196 may be interposed to send direct current through the amplifier 189. It will not be necessary to show or describe any specific system for amplifying the feeble electric impulses of pickup 71 to operate loudspeaker 30, because amplifying systems of various types are well known in the art of radio receivers and electric phonographs. Such systems usually include one or more vacuum tubes and are well understood by those skilled in the art. For this reason I have deemed it sufficient to indicate a suitable amplifying system by the diagrammatic outline 189. The loudspeaker 30 may be of the flat condenser type, as heretofore mentioned, but it can be an ordinary cone speaker operated either by a moving coil (the so-called electrodynamic type) or by a vibratory armature.

In the present instance I have provided switch mechanism for connecting the amplifier 189 and loudspeaker 30 (or the loudspeaker alone) with the output circuit of a radio receiver which does not have a loudspeaker of its own. For this purpose the output terminals of the radio set are connected to conductors 198 and 199, which lead respectively to conductor 190 and switch contact 200. A conductor 201 leads from the house-lighting main 142 to a switch contact 202. The two conductors 191 and 193 terminate in switch contacts 203 and 204 respectively, and the two conductors 192 and 194 are connected to a pair of insulated switch arms 205 and 206. These two switch arms may be mounted as a single rotary arm with two insulated end portions. A rotary knob or other suitable finger piece 207 mounted on panel 15 is adapted to operate the switch arms 205 and 206 for connecting either a radio receiver or a phonograph record to the loudspeaker 30. When the switch arms 205 and 206 engage contacts 203 and 204 respectively, the circuit of pickup 71 is closed through the amplifier and loudspeaker. When the knob 207 is turned counterclockwise to connect the switch arms 205 and 206 with contacts 200 and 202, the pickup circuit is broken and the radio leads 198 and 199 are connected to amplifier 189 and loudspeaker 30. If the radio receiver is of a type that does not require the additional amplifier 189, the radio leads 198a and 199a are connected directly to the loudspeaker conductors 189c and 189d. The radio receiver may be housed in cabinet 10 or located at a distance. In a simplified form of my invention the radio-record switch knob 207 may be omitted, in which case the conductors 191 and 192 would be a single conductor, and the same would apply to conductors 193 and 194.

The switch panel 15 also has a knob 208 for controlling the volume of loudspeaker 30. I have purposely omitted the volume-controlling circuits from Fig. 9, because they form no part of my invention and are well understood by those familiar with radio circuits. A small signal lamp 209 on panel 15 is automatically lighted when the switch member 146 is moved to "on" position. A resistance 210 may be inserted to cut down the house-lighting voltage to that required by lamp 209. A colored lens will usually be mounted on panel 15 in front of the lamp, so that the operator may receive a bright visual signal to let him know that the main operating circuit is on. The switch arm 144 controls not only the circuit of driving motor 76, but all other circuits of the apparatus. In other words, when the finger piece 146 on panel 15 is in "off" position, the operator is assured that all circuits are open. The open condition of the circuits is further indicated by the fact that the lamp 209 is out. Such electric devices as the motion picture projector P may contain are connected to the service mains 141 and 142 by conductors 211.

The operation of my talking movie cabinet will be understood from the foregoing description, but I may summarize it in a couple of paragraphs by referring to Figs. 8 and 9. Let us suppose that the machine is to be used for projecting a talking picture. After the film has been loaded in the projector, and the stylus of the pickup placed in correct starting position on a record, the main switch 146 on panel 15 is moved to "on" position. This connects the apparatus with the power supply leads 141—142, and lights the signal lamp 209, but it does not start the driving motor 76 because the switch 139' is still open.

The next thing the operator does is to push the button 164 marked "Talking movie", whereby the electromagnet 113 is energized for connecting the motor shaft 76' to bevel gears 77 and 137. The button 164, like all the other push buttons on panel 15, need be pushed in for only a second. The proper driving connections being thus assured, the operator now closes the motor switch 139' to start the record on turntable 36 and the film in projector P. There should be no difficulty in starting the picture and phonograph in synchronism, because it is customary for the manufacturer to mark the starting points on records and films. When the end of the talking picture is reached, the motor is stopped by opening either the motor switch 139' or the main switch 146. It is also possible to provide automatic stopping mechanism, such as I have shown and described in a pending application, but that forms no part of the present invention. To project a silent film, button 163 marked "Picture only" is pushed in, whereby the electromagnet 112 is energized to disconnect the turntable shaft 37 and connect the projector shaft 122 to motor 76. When the switch button 165 marked "Record only" is pushed in, the electromagnet 114 is energized to disconnect the projector shaft 122 and connect the turntable shaft 37 with the driving motor, so that the machine operates as a simple phonograph. In this case, the handle 67 (see Fig. 7) may be pushed back to disconnect the pickup arm 70 from shaft 52, whereby the pickup 71 is fed across the record by gravity in the usual way. Since the machine will ordinarily be in condition to play the standard-speed records intended to operate at 78 revolutions per minute, no attention need be paid to the speed-changing buttons 174 and 175. When a low-speed record is used, the button 174 is pushed in to energize the electromagnet 100.

As I said before, there should be no difficulty in starting the film and record in perfect synchronism, but if a wrong start should be made, it is quickly corrected by simply moving the switch member 187 to one side or the other. It is easy to tell whether the picture is running ahead of the record or behind it, so that the operator either speeds up the picture by moving the switch 187 to the right, or slows the picture down by shifting the switch to the left. As soon as he observes that the picture and record are running even, he releases the switch button 187 which instantly snaps back to neutral position. This resynchronizing operation is resorted to at any time during the running of the talking film when the synchronism has for some reason been lost. If the film and record are started right, the synchronism will ordinarily be maintained throughout the entire picture, because the turntable shaft 37 and projector shaft 122 are geared to the common driving motor 76, and further because the pickup stylus can not jump sideways out of the sound groove. Nevertheless, there is sometimes need for resynchronization during the run of the picture, as when the original length of film has been shortened in the mending of a break. It is important to notice that the resynchronizing operation takes place without interruption of the picture. The volume of reproduction is controlled to suit the hearers by turning the knob 208 one way or the other. When it is desired to connect a radio set to loudspeaker 30, the operator first opens either one of the switches 139' and 146 to disconnect the motor 76, and then he turns the knob 207 to the "Radio" position. Instead of operating the motor switch 139' by hand independently of the push buttons 163, 164 and 165, I may so connect the switch to these buttons that the operation of any button automatically closes the motor switch after the associated electromagnet 112, 113 or 114 has been energized. In that case no separate motor switch is needed on panel 15.

Figs. 10-14 show a modified form of mounting and driving connections for the phonograph pickup 71. In this instance the pickup arm 212 is mounted for slidable movement along a fixed rod 213 to propel the stylus point laterally across the record at the correct speed. The rod 213 is supported between a pair of posts or brackets 214 mounted on top board 34 of the cabinet. The brackets 214 also support a rotary screw shaft 215 which carries at one end a gear 216 covered by a housing 217. Below the top board 34 is a shaft 218 supported in brackets 219 which depend from the underside of the top board. One end of shaft 218 carries a gear 220, and the other end carries a bevel gear 221. The gear 220 is connected to gear 216 on screw shaft 215 through an interposed pinion 222 which is mounted on a shaft or pin 223 in an opening 224 of top board 34. The bevel gear 221 on shaft 218 meshes with a bevel gear 225 on a shaft 226 supported in brackets 227 from the underside of top board 34. The bevel gear 38 on turntable shaft 37 meshes with a bevel gear 228 on shaft 226, whereby the movements of shaft 37 are transmitted to shaft 218 and through gears 220—222—216 to the screw shaft 215. The pickup arm 212 terminates in a rear extension 229 (see Figs. 13 and 14) which is provided with screwthreads 230 adapted to engage the screwthreads of shaft 215. The screwthreads 230 of arm 212 are in a cylindrical recess 231 which does not cover more than half a circumference, so that the extension 229 can easily be moved into and out of operative engagement with the rotary screw shaft 215. The pickup arm 212 can be swung back on rod 213 into the dotted line position 212'. A rod 232 mounted between the brackets 214 forms a stop for the rearward movement of arm 212, as will be clear from Figs. 11 and 13.

Still referring to Figs. 10-14, the transmission connections between the vertical turntable shaft 37 and the horizontal pickup arm 212, including the pitch of the screwthreads on shaft 215 and extension 229, are so calculated that the stylus point of pickup 71 is propelled at the correct speed across a rotating record on turntable 36. It is assumed that the turntable shaft 37 in Figs. 10 and 11 is operated by the electric motor 76 in the manner described in connection with Fig. 5, and what has heretofore been said about the synchronism between sound and picture is applicable to the movements of the pickup stylus in Figs. 10-14. As long as the screwthreads 230 on pickup arm 212 are in engagement with screw shaft 215, the stylus of pickup 71 is positively held in the record groove to insure synchronism between sound and picture. No lateral movement or free play of arm 212 is possible, because the weight of the arm holds the screwthreads of extension 229 pressed firmly against the screwthreads of shaft 215. When it is desired to move the arm 212 from final to starting position, it need only be lifted a little way to disconnect the screwthreads 230 from shaft 215, whereupon the arm is freely slidable on rod 213. I have assumed that the pickup 71 in Figs. 6 and 10 plays from edge to center of the record, but the transmission connections may also be arranged to propel the stylus in the opposite direction for playing records that start at the center.

Although I have shown and described certain specific constructions, I want it understood that my invention is not limited to the details set forth. The fundamental features of my invention may be embodied in various other forms, without departing from the scope of the appended claims. Furthermore, some features of my invention may be used without others, and it is manifest that the apparatus may be built on a large scale for the exhibition of standard-sized talking pictures in theaters.

I claim as my invention:

1. In talking movie apparatus, the combination of an electric motor, a turntable for supporting phonograph records, adjustable transmission connections between said motor and turntable for selectively operating the latter at one normal speed to play high-speed records or at another normal speed to play low-speed records, either speed being definitely determined by said transmission connections and substantially constant for its particular type of record, said transmission connections being such that the difference between said two normal speeds is considerable as distinguished from a slight difference, a motion picture projector having a film shaft driven by said motor in synchronism with either type of record on said turntable, the speed of said film shaft being unaffected by the adjustment of said transmission connections, and manually controllable synchronizing means for momentarily changing the speed of the film shaft without affecting the speed of said turntable.

2. In talking picture apparatus, in combination, a record support, a motion picture projector, power means operatively connected with said record support and said projector for driving the same simultaneously, means adjustable to cause said record support to be driven at two different definite speeds for playing two different types of records at two different normal speeds by operation of the power means at constant speed, either speed being definitely determined and substantially constant for its particular type of record, the difference between said two normal speeds being considerable as distinguished from a slight difference, and means for varying the relative rates of speed of the projector and the record support to synchronize the action of a picture being projected with the sound of a record being played at either of said two different normal speeds.

3. In talking picture apparatus, in combination, a record support, a motion picture projector, power means operatively connected with said record support and said projector for driving the same simultaneously, means adjustable to cause said record support to be driven at two different definite speeds for playing two different types of records at two different normal speeds by operation of the power means at constant speed, either speed being definitely determined and substantially constant for its particular type of record, the difference between said two normal speeds being considerable as distinguished from a slight difference, and means independent of said last named means for varying the relative rates of speed of the projector and the record support to synchronize the action of a picture being projected with the sound of a record being played at either of said two different normal speeds.

4. In talking picture apparatus, in combination, a record support, a motion picture projector, power means operatively connected with said record support and said projector for driving the same simultaneously, means included in the connection between said power means and said record support adjustable to cause said record support to be driven at two different definite speeds for playing two different types of records at two different normal speeds by operation of the power means at constant speed, either speed being definitely determined and substantially constant for its particular type of record, the difference between said two normal speeds being considerable as distinguished from a slight difference, and means for varying the relative rates of speed of the projector and the record support to synchronize the action of a picture being projected with the sound of a record being played at either of said two different normal speeds.

5. In talking picture apparatus, in combination, a record support, a motion picture projector, power means operatively connected with said record support and said projector for driving the same simultaneously, means adjustable to cause said record support to be driven at two different definite speeds for playing two different types of records at two different normal speeds by operation of the power means at constant speed, either speed being definitely determined and substantially constant for its particular type of record, the difference between said two normal speeds being considerable as distinguished from a slight difference, and means included in the connection between said power means and said projector for varying the relative rates of speed of the projector and the record support to synchronize the action of a picture being projected with the sound of a record being played at either of said two different normal speeds.

6. In talking picture apparatus, in combination, a record support, a motion picture projector, power means operatively connected with said record support and said projector for driving the same simultaneously, means included in the connection between said power means and said record support adjustable to cause said record support to be driven at two different definite speeds for playing two different types of records at two different normal speeds by operation of the power means at constant speed, either speed being definitely determined and substantially constant for its particular type of record, the difference between said two normal speeds being considerable as distinguished from a slight difference, and means included in the connection between said power means and said projector for varying the relative rates of speed of the projector and the record support to synchronize the action of a picture being projected with the sound of a record being played at either of said two different speeds.

7. In talking picture apparatus, in combination, a record support, a motion picture projector, power means operatively connected with said record support and said projector for driving the same simultaneously, means adjustable to cause said record support to be driven at two different definite speeds for playing two different types of records at two different normal speeds by operation of the power means at constant speed, either speed being definitely determined and substantially constant for its particular type of record, the difference between said two normal speeds being considerable as distinguished from a slight difference, and means for increasing and decreasing the speed of the projector relative to the speed of the record support when the latter is driven at either of its two different normal speeds for synchronizing the action of a picture being projected with the sound of a record being played at either of said two different normal speeds.

8. In talking picture apparatus, in combination, a record support, a motion picture projector, power means operatively connected with said record support and said projector for driving the same simultaneously, means adjustable to cause said record support to be driven at two different definite speeds for playing two different types of records at two different normal speeds of operation of the power means at constant speed, either speed being definitely determined and substantially constant for its particular type of record, the difference between said two normal speeds being considerable as distinguished from a slight difference, means for varying the relative rates of speed of the projector and the record support to synchronize the action of a picture being projected with the sound of a record being played at either of said two different normal speeds, and means for operatively disconnecting the record support from said power means.

9. In talking picture apparatus, in combination, a record support, a motion picture projector, power means operatively connected with said record support and said projector for driving the same simultaneously, means adjustable to cause said record support to be driven at two different definite speeds for playing two different types of records at two different normal speeds of operation of the power means at constant speeds, either speed being definitely determined and substantially constant for its particular type of record, the difference between said two normal speeds being considerable as distinguished from a slight difference, means for varying the relative rates of speed of the projector and the record support to synchronize the action of a picture being projected with the sound of a record being played at either of said two different normal speeds, and means for operatively disconnecting the projector from said power means.

10. In talking picture apparatus, in combination, a record support, a motion picture projector, power means operatively connected with said record support and said projector for driving the same simultaneously, means included in the connection between said power means and said record support adjustable to cause said record support to be driven at two different definite speeds for playing two different types of records at two different normal speeds by operation of the power means at constant speed, either speed being definitely determined and substantially constant for its particular type of record, the difference between said two normal speeds being considerable as distinguished from a slight difference, means included in the connection between said power means and said projector for varying the relative rates of speed of the projector and the record support to synchronize the action of a picture being projected with the sound of a record being played at either of said two different speeds, and means included in the connection of the power means with the projector and the record support selectively operable to connect and disconnect either or both the projector and the record support with and from the power means.

11. In talking picture apparatus, in combination, a record support, a pickup to traverse a record disposed on said record support, a motion picture projector, power means operatively connected with said record support and said projector for driving the same simultaneously, means included in the connection between the power means and the record support adjustable to cause said record support to be driven at two different definite speeds for playing two different types of records at two different normal speeds by operation of the power means at constant speed, means for varying the relative rates of speed of the projector and the record support to synchronize the action of a picture being projected with the sound of a record being played at either of said two different normal speeds, and means also included in the connection of the power means with the record support, between the latter and the means adjustable to cause driving of the record at two different normal speeds, for positively advancing the pickup across the record.

12. In talking picture apparatus, a cabinet, the front of said cabinet including in part a screen and in part means to shield from view devices disposed within the cabinet, a picture projector and a phonograph operating mechanism disposed within said cabinet behind said shield means and in such positions relative to each other and to the cabinet as to afford an unobstructed space for the passage of the light beam from the projector around the latter and the operating mechanism to the screen, means within the cabinet for directing the light beam from the projector around the same and said mechanism and through said space to the screen, and means in said cabinet for maintaining synchronism between the action of said picture projector and the action of said phonograph mechanism.

13. In combination, a pair of shafts, a main motor, a controllable mechanical driving connection between said main motor and one of said shafts, a second motor, a driving connection between said second motor and the other shaft, and another driving connection between said main motor and the driving connection for the second shaft creating a driving relationship between said motors with respect to said second shaft.

14. In talking movie apparatus, the combination of a record-driving shaft, a film-driving shaft, an electric motor connected to both of said shafts for simultaneously operating the same at predetermined normal speeds, a second electric motor operable independently of the first motor, and a variable driving connection between said second motor and one of said shafts for varying the speed of the latter without disconnecting it from the first motor and without affecting the speed of the other shaft.

15. In talking movie apparatus, the combination of a record-driving shaft, a film-driving shaft, an electric motor connected to both of said shafts for simultaneously operating the same at predetermined normal speeds, a second electric motor operable independently of the first motor, said second motor being reversible, a variable driving connection between said second motor and the film shaft for varying the speed of the latter without disconnecting it from the first motor and without affecting the normal speed of the record shaft, and hand-operable switch means for selectively energizing the second motor to run in either direction, one way for increasing and the other way for decreasing the normal speed of the film shaft until the required synchronism between the two shafts is established.

16. In an associated motion picture projector and phonograph mechanism, a motor-actuated drive shaft, a projector shaft having a projector film driving sprocket, a manipulatable clutch device for connecting at will said projector shaft in driven relation to said drive shaft, a phonograph turn-table, a transmission means for driving said turn-table at one speed, a second transmission means for driving said turn-table at another speed, each transmission means having a clutch means for engaging the same in driven relation to said drive shaft, and a clutch shift mechanism common to each clutch means and operative to release one clutch means when engaging the other.

ADOLPH A. THOMAS.